United States Patent

Beeson

(10) Patent No.: US 8,997,780 B2
(45) Date of Patent: Apr. 7, 2015

(54) FUEL FLOAT VALVE

(75) Inventor: William Beeson, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 304 days.

(21) Appl. No.: 13/157,410

(22) Filed: Jun. 10, 2011

(65) Prior Publication Data

US 2012/0312377 A1 Dec. 13, 2012

(51) Int. Cl.
*F16K 31/18* (2006.01)
*B64D 37/32* (2006.01)
*F16K 31/22* (2006.01)
*F16K 31/26* (2006.01)

(52) U.S. Cl.
CPC ........ *B64D 37/32* (2013.01); *F16K 31/22* (2013.01); *F16K 31/26* (2013.01)

(58) Field of Classification Search
CPC ........ F16K 31/18; F16K 31/22; F16K 31/24; F16K 24/048; F16K 33/00; F16K 17/04
USPC .......... 137/625.44, 527, 527.4, 527.6, 527.8, 137/43, 202, 409, 410, 448, 213, 263, 137/614.17, 630, 614.16, 614.18, 512.2, 137/512.1, 543.21, 543.19, 537, 516.11; 220/88.3; 244/135 R, 135 A, 135 B, 244/135 C; 73/454, 317
See application file for complete search history.

(56) References Cited

U.S. PATENT DOCUMENTS

| | | | |
|---|---|---|---|
| 886,045 A * | 4/1908 | Ehrlich et al. ............ | 137/543.19 |
| 1,038,685 A * | 9/1912 | Titus et al. .................. | 137/526 |
| 1,323,168 A * | 11/1919 | De Rigne ................... | 137/512.2 |
| 1,665,394 A * | 4/1928 | Willoughby .............. | 137/614.11 |
| 1,959,644 A * | 5/1934 | Richardson .............. | 137/543.19 |
| 2,549,409 A * | 4/1951 | Atkinson .................... | 137/263 |
| 2,673,618 A | 3/1954 | Batchelder | |
| 2,689,461 A * | 9/1954 | Brandon ..................... | 137/339 |
| 2,870,936 A * | 1/1959 | Clayton ...................... | 220/88.3 |
| 3,559,679 A | 2/1971 | Smirra | |
| 3,587,618 A * | 6/1971 | Kenyon ...................... | 220/88.3 |
| 3,691,730 A * | 9/1972 | Hickey et al. ............. | 244/135 R |
| 3,710,549 A * | 1/1973 | Nichols et al. ............. | 220/88.3 |
| 3,732,668 A * | 5/1973 | Nichols ...................... | 220/88.3 |
| 4,095,614 A | 6/1978 | Marmon | |
| 4,149,372 A | 4/1979 | Gavin et al. | |
| 4,376,446 A | 3/1983 | Liff | |

(Continued)

OTHER PUBLICATIONS

European Search Report for EP Application No. 12170612.1, Nov. 6, 2012.

*Primary Examiner* — John F Fristoe, Jr.
*Assistant Examiner* — Craig J Price
(74) *Attorney, Agent, or Firm* — Carlson, Gaskey & Olds, P.C.

(57) ABSTRACT

In one example, a fuel system includes a fuel tank having a wall with an opening. A fuel float valve has a float and a seal plate on opposing ends of a beam. The fuel float valve also includes a fulcrum about which the beam is configured to pivot in response to a change in fuel level. The fuel float valve is movable between unsealed and sealed positions in which the seal plate is respectively unsealed and sealed relative to the opening. The seal plate includes first and second portions. The first portion seals against the wall, and the second portion is movable relative to the first portion in the sealed position from a closed position to an open position with respect to the first portion.

7 Claims, 2 Drawing Sheets

(56) References Cited

U.S. PATENT DOCUMENTS

| | | | |
|---|---|---|---|
| 4,378,920 A * | 4/1983 | Runnels et al. ............ 244/135 R |
| 5,031,655 A | 7/1991 | Hebaus | |
| 5,062,444 A | 11/1991 | Bergsma | |
| 5,172,714 A | 12/1992 | Kobayashi et al. | |
| 5,193,579 A * | 3/1993 | Bauer et al. ............... 137/543.19 |
| 5,241,983 A * | 9/1993 | Lagache ....................... 137/448 |
| 5,782,258 A | 7/1998 | Herbon et al. | |
| 6,234,195 B1 * | 5/2001 | Kippe et al. ............... 137/493.3 |
| 6,564,820 B2 | 5/2003 | Christman | |
| 6,634,598 B2 * | 10/2003 | Susko ....................... 244/135 R |
| 6,837,256 B2 * | 1/2005 | Benjey ............................ 137/420 |
| 6,851,255 B2 | 2/2005 | Aitchison et al. | |
| 7,013,905 B2 * | 3/2006 | Jones et al. ................... 220/88.3 |
| 7,073,530 B2 * | 7/2006 | Pyle et al. ..................... 137/587 |
| 7,114,519 B2 | 10/2006 | Aitchison et al. | |
| 7,481,237 B2 * | 1/2009 | Jones et al. ................... 220/88.3 |
| 7,621,483 B2 | 11/2009 | Cozens et al. | |
| 7,918,358 B2 * | 4/2011 | Gupta ........................... 220/88.3 |
| 7,971,828 B2 * | 7/2011 | Massey et al. ............ 244/135 R |
| 8,074,932 B2 * | 12/2011 | Surawski .................. 244/135 R |
| 2014/0027575 A1 * | 1/2014 | Goto ......................... 244/135 C |

* cited by examiner

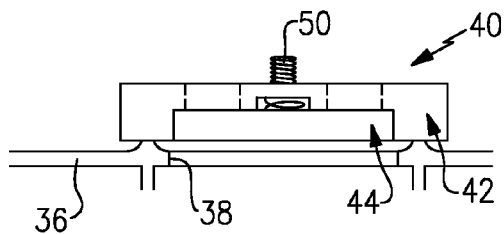
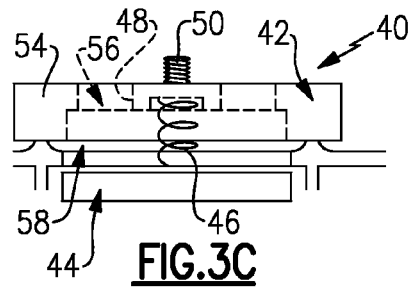
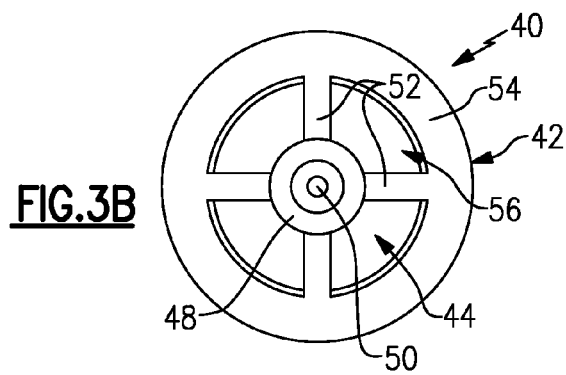
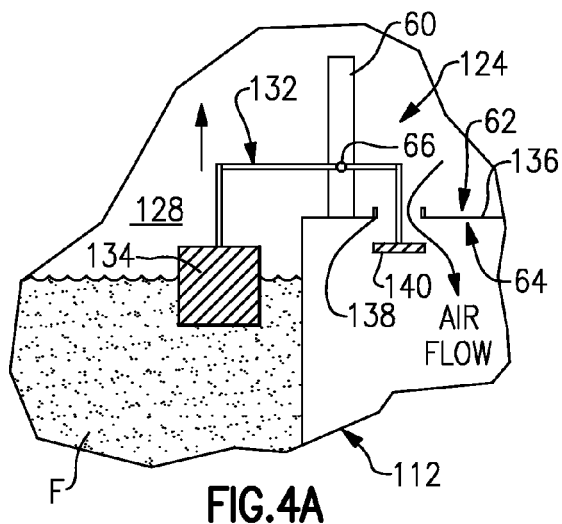
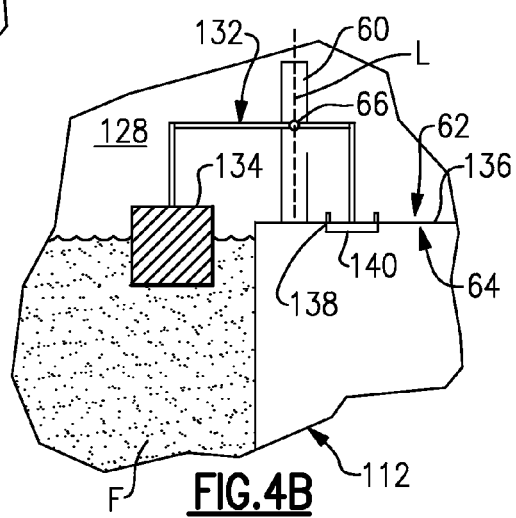

FUEL FLOAT VALVE

BACKGROUND

This disclosure relates to a fuel float valve. More particularly, the disclosure relates to a fuel float valve for use in an aircraft fuel system.

One typical fuel system for an aircraft includes multiple fuel tanks. A surge tank is fluidly connected to at least one of the fuel tanks. A nitrogen generation system provides nitrogen to the fuel tanks to fill any gaseous cavities with inert gas.

A fuel float valve is arranged in one of the fuel tanks to selectively vent gases from the fuel tank to the surge tank. One type of fuel float valve is a flapper valve in which a float is arranged on one side of a beam and a plate is arranged on the other side of the beam. The beam pivots about a fulcrum. As the fuel level rises within the tank, the flapper valve pivots to seal an opening in a wall in the fuel tank with the plate. The plate blocks fluid flow from the fuel tank to the surge tank, for example, during turning maneuvers.

Under some conditions, the plate may undesirably remain sealed against the wall after the fuel level falls. For example, the nitrogen generation system may generate enough pressure in some circumstances to maintain the plate in the closed position. However, the fuel tank should again be permitted to vent to the surge tank.

SUMMARY

A fuel system includes a fuel tank having a wall with an opening. A fuel float valve has a float and a seal plate on opposing ends of a beam. The fuel float valve also includes a fulcrum about which the beam is configured to pivot in response to a change in fuel level. The fuel float valve is movable between unsealed and sealed positions in which the seal plate is respectively unsealed and sealed relative to the opening. The seal plate includes first and second portions. The first portion seals against the wall, and the second portion is movable relative to the first portion in the sealed position from a closed position to an open position with respect to the first portion.

A fuel float valve plate includes a first portion including a central support interconnected to an annular portion by radially extending legs circumferentially spaced from one another to provide spaces. A second portion is configured to provide opened and closed positions relative to the first portion to selectively provide a gap between the first and second portions. A biasing member interconnects between the first and second portions to bias the second portion to the closed position. The gap is covered by the second portion in the closed position, and the spaces are unobstructed in the first position to provide the gap.

Another type of fuel float valve includes a float and a seal plate on opposing ends of a beam. A support carries a connection of the beam. The beam is configured to translate along the support at the connection in response to a changing fuel level. The fuel float valve is moveable between first and second positions in which the seal plate is respectively sealed and unsealed relative to the opening. The seal plate is moveable relative to the opening in the second position.

A method of regulating fluid flow through a fuel tank includes the steps of moving a float and a plate in response to a changing fuel level. An opening in a wall is blocked with the plate to provide a sealed condition. The opening is unobstructed with a portion of the plate in the sealed condition to provide pressure relief.

BRIEF DESCRIPTION OF THE DRAWINGS

The disclosure can be further understood by reference to the following detailed description when considered in connection with the accompanying drawings wherein:

FIG. 3A is a schematic view of a plate illustrated in FIG. 2B in a closed position.

FIG. 3B is an elevational view of the plate illustrated in FIG. 3A.

FIG. 3C is a schematic view of the plate illustrated in FIG. 3A in an open position.

FIG. 4A is a schematic view of another fuel float valve in an unsealed position at a first fuel level.

FIG. 4B is a schematic view of the fuel float valve shown in FIG. 4A in the sealed position at a second fuel level that is greater than the first level.

DETAILED DESCRIPTION

Figure 1:
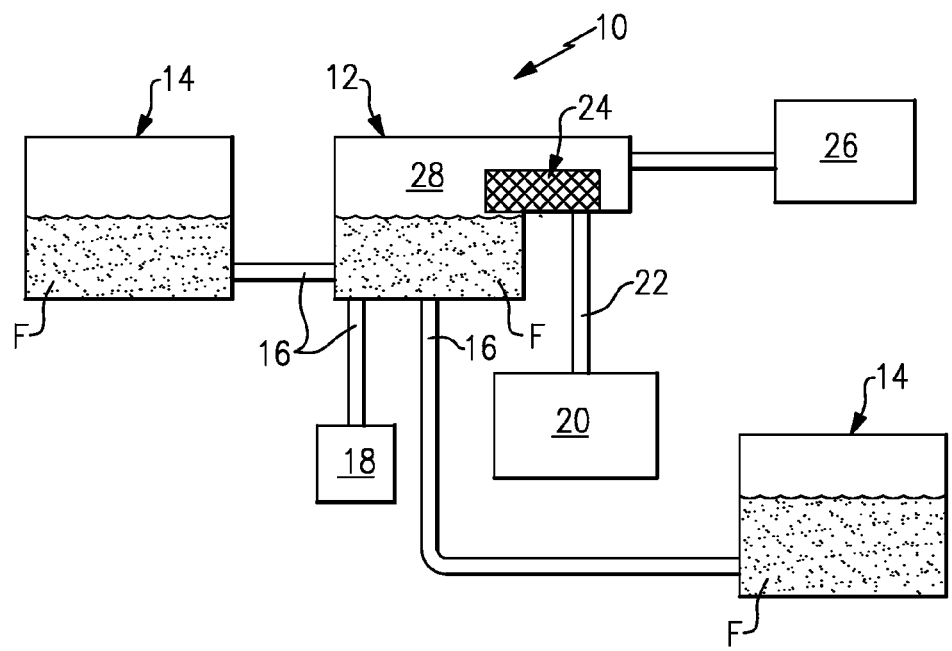
FIG. 1 is a schematic view of a fuel system.

A fuel system 10 is schematically illustrated in FIG. 1. The system 10 is typical of an aircraft fuel system, and includes a center tank 12 fluidly connected to lateral tanks 14 by fuel lines 16. The fuel system 10 supplies fuel F to a component 18, such as a gas turbine engine.

A surge tank 20 is fluidly connected to at least one of the tanks, such as the center tank 12, by a vent line 22. A nitrogen generation system 26 is fluidly connected to the center tank 12 to provide nitrogen gas to the fuel system 10 to fill the gaseous cavities within the tanks with inert gas, such as cavity 28 in the center tank 12.

A fuel float valve 24 selectively regulates the flow of gases from the cavity 28 to the surge tank 20. As the level of fuel F within the center tank 12 rises, the fuel flow valve 24 will close to block fuel flow from the center tank 12 to the surge tank 20, thus preventing fuel from pouring into the surge tank 20.

It is desirable to prevent the fuel float valve from becoming stuck in a closed or sealed position even after the fuel level decreases. A stuck valve can prevent proper venting of the center tank 12 to the surge tank 20. To this end, the fuel float valve 24 includes a feature for insuring that it can still vent even if it becomes stuck.

Figure 2A:
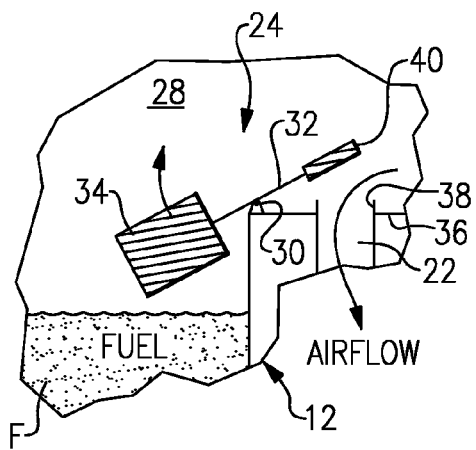
FIG. 2A is a schematic view of an example fuel float valve in an unsealed position at a first fuel level.
Figure 2B:
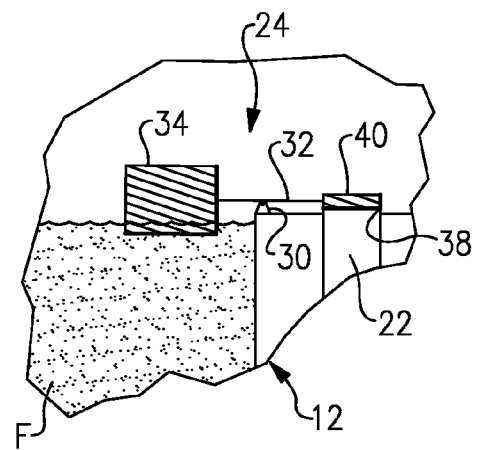
FIG. 2B is a schematic view of the fuel float valve illustrated in FIG. 2A in a sealed position at a second fuel level that is greater than the first level.

The fuel float valve 24 includes a beam 32 having a float 34 and a plate 40 at opposing ends, as illustrated in FIGS. 2A-2B. The beam 32 pivots about a fulcrum 30. The plate 40 selectively blocks an opening 38 in a wall 36 of the center tank 12. The opening 38 fluidly connects the center tank 12 to the surge tank 20. Flow through the opening 38 is blocked in a closed position with the plate 40 sealed against the wall 36.

Referring to FIGS. 3A-3C, the plate 40 includes first and second portions 42, 44 that are moveable relative to one another. The first portion 42 includes a central support 48 having a fastener 50 that secures the plate 40 to the beam 32. Legs 52 extend radially from the central support 48 and are interconnected to an annular portion 54, which provides a sealing surface configured to seal against the wall 36. Spaces 56 are provided between the central support 48, legs 52 and annular portion 54. The second portion 44 blocks the spaces 56 in a closed position (FIG. 3A).

A biasing member 46, such as a spring, urges the second portion 44 to the closed position relative to the first portion 42.

In response to a predetermined pressure differential across the plate 40, the force of the biasing spring is overcome permitting the second portion 44 to move out of engagement with the first portion 42, creating a gap 58. The gap 58 permits fluid flow through the plate 40 even with the first portion 42 sealed against the wall 36. Thus, the second portion 44 acts as a relief valve in the plate 40 should become stuck closed.

Another fuel float valve 124 is illustrated in FIG. 4A-4B. A guide or support 60 is mounted within the cavity 128 of the fuel tank 112. The fuel float valve 124 includes a beam 132 that supports a float 134 and a plate 140 at opposing ends. The beam 132 is supported for translation by the support 60 at a connection 66. In one example, the support 60 provides a linear path L along which the fuel float valve 124 moves vertically in response to changes in the fuel level, as illustrated in the figures. The wall 136 defines first and second sides 62, 64. The first side 62 is provided within the cavity 128. The plate 140 is arranged on the second side 64, which is unpressurized, preventing an increased pressure from the nitrogen generation system from holding the plate 140 in a closed position. Rising pressure within the cavity 128 will force the plate out of engagement with the wall 136, and unobstruct the opening 138.

Although an example embodiment has been disclosed, a worker of ordinary skill in this art would recognize that certain modifications would come within the scope of the claims. For that reason, the following claims should be studied to determine their true scope and content.

What is claimed is:

1. A fuel system comprising:
   a fuel tank having a wall with an opening;
   a fuel float valve including a float and a seal plate on opposing ends of a beam, and a fulcrum about which the beam is configured to pivot in response to a changing fuel level, the fuel float valve movable between unsealed and sealed positions in which the seal plate is respectively unsealed and sealed relative to the opening; and
   wherein the seal plate includes first and second portions, the first portion sealing against the wall and the second portion movable relative to the first portion in the sealed position from a closed position to an open position with respect to the first portion.

2. The fuel system according to claim 1, further comprising a surge tank fluidly connected to the fuel tank by a vent line and configured to receive fluid from the fuel tank, the seal plate blocking flow between the fuel and surge tanks in the sealed position.

3. The fuel system according to claim 2, further comprising a nitrogen gas system fluidly connected to the fuel tank at a first side of the opening, the surge tank fluidly connected to the fuel tank at a second side of the opening opposite the first side.

4. The fuel system according to claim 1, wherein the opened and closed positions selectively provide a gap between the first and second portions.

5. The fuel system according to claim 4, wherein the fuel float valve includes a biasing member interconnected between the first and second portions to bias the second portion to the closed position.

6. The fuel system according to claim 4, wherein the first portion includes a central support interconnected to an annular portion by radially extending legs circumferentially spaced from one another to provide spaces that are covered by the second portion in the closed position, the spaces unobstructed in the first position to provide the gap.

7. A fuel float valve plate assembly comprising:
   a wall providing an opening;
   a first portion movable relative to the wall between unsealed and sealed positions in which the first portion is respectively unsealed and sealed relative to the opening in response to a fluid level relative to the wall, the first portion including a central support interconnected to an annular portion by radially extending legs circumferentially spaced from one another to provide spaces;
   a second portion configured to provide opened and closed positions relative to the first portion to selectively provide a gap between the first and second portions; and
   a biasing member interconnected between the first and second portions to bias the second portion to the closed position, the gap covered by the second portion in the closed position, the spaces unobstructed in the first position to provide the gap.

\* \* \* \* \*